US012246665B2

United States Patent
Dorsey et al.

(10) Patent No.: US 12,246,665 B2
(45) Date of Patent: Mar. 11, 2025

(54) SYSTEM AND METHOD FOR POWERING A VEHICLE ACCESSORY

(71) Applicant: Joseph & Roberts, LLC, Las Vegas, NV (US)

(72) Inventors: Bradley Dorsey, Las Vegas, NV (US); Brian Feldman, Macungie, PA (US); Brian Wittman, Indianapolis, IN (US)

(73) Assignee: Joseph & Roberts, LLC, Las Vegas, NV (US)

( * ) Notice: Subject to any disclaimer, the term of this patent is extended or adjusted under 35 U.S.C. 154(b) by 0 days.

(21) Appl. No.: 18/670,260

(22) Filed: May 21, 2024

(65) Prior Publication Data

US 2024/0391404 A1     Nov. 28, 2024

Related U.S. Application Data

(60) Provisional application No. 63/634,265, filed on Apr. 15, 2024, provisional application No. 63/613,976, (Continued)

(51) Int. Cl.
*B60R 16/03*     (2006.01)

(52) U.S. Cl.
CPC .................................. *B60R 16/03* (2013.01)

(58) Field of Classification Search
CPC ....................................................... B60R 16/03
(Continued)

(56) References Cited

U.S. PATENT DOCUMENTS

| 2007/0182248 A1 | 8/2007 | Blaker et al. |
| 2010/0231037 A1 | 9/2010 | Esaka et al. |

(Continued)

FOREIGN PATENT DOCUMENTS

| JP | 2020019478 A | 2/2020 |
| JP | 2023030995 A | 3/2023 |
| KR | 1020220009250 A | 1/2022 |

OTHER PUBLICATIONS ssontong. Amazon.com: SSONTONG upgraded OBD2 OBD Power Cable for Dash Camera, OBD to type-C USB obdii adapter hardwire charger cable 24 Hours surveillance and ACC two mode with Switch Button (Type-C USB port): Electronics. Amazon. https://www.amazon.com/ssontong-Upgraded-Adapter-Hardwire-Surveillance/dp/B0BZYN7MQT. (10 Pages) Retrieved on May 30, 2024.

(Continued)

*Primary Examiner* — Michael R. Fin
(74) *Attorney, Agent, or Firm* — Maginot, Moore & Beck, LLP

(57) ABSTRACT

A power supply configured for installation in a vehicle is disclosed herein. The vehicle includes a battery, an on-board diagnostics (OBD) port, and a vehicle accessory. In at least one embodiment, the power supply includes a controller area network (CAN) input configured for connection to a CAN pin of the OBD port, a battery input configured for connection to a battery pin of the OBD port, at least one power output configured for connection to a vehicle accessory, and a controller circuit. The controller circuit is configured to (i) monitor a CAN voltage provided via the CAN input, (ii) monitor a battery voltage provided via the battery input, and (iii) selectively deliver power to the at least one power output depending at least in part on the CAN voltage and the battery voltage.

20 Claims, 8 Drawing Sheets

Related U.S. Application Data filed on Dec. 22, 2023, provisional application No. 63/503,613, filed on May 22, 2023.

(58) Field of Classification Search
USPC .......................................................... 307/10.1
See application file for complete search history.

(56) References Cited

U.S. PATENT DOCUMENTS

| | | | |
|---|---|---|---|
| 2016/0196096 A1* | 7/2016 | Nishida | G06F 3/1288 |
| | | | 358/1.15 |
| 2018/0277028 A1* | 9/2018 | Mader | B60R 1/04 |
| 2023/0415761 A1* | 12/2023 | Sura | B60W 50/0205 |

OTHER PUBLICATIONS

Written Opinion concerning International Application No. PCT/US2024/030409 dated Sep. 10, 2024. (5 Pages).

International Search Report concerning International Application No. PCT/US2024/030409 dated Sep. 10, 2024. (4 Pages).

* cited by examiner

SYSTEM AND METHOD FOR POWERING A VEHICLE ACCESSORY

CROSS-REFERENCE TO RELATED APPLICATIONS

The present application claims priority to U.S. Provisional Patent Application No. 63/634,265, filed Apr. 15, 2024, U.S. Provisional Patent Application No. 63/613,976, filed Dec. 22, 2023, and U.S. Provisional Patent Application No. 63/503,613, filed May 22, 2023; the entire contents of each of the foregoing applications are incorporated herein by reference in their entirety.

FIELD

The present disclosure relates to electrical power supplies, and particularly to systems and methods used to provide power to accessories used in motor vehicles.

BACKGROUND

Many vehicles today are equipped with accessory components which require power from the vehicle for operation. Examples of accessory components for vehicles (which may also be referred to herein as simply vehicle "accessories") include dashboard cameras, radar detectors, lighting kits, audio/video units, and any number of additional accessories as will be recognized by those of ordinary skill in the art. In most situations, power to the accessory components is desired when the vehicle is on, and power to the accessory components is not desired when the vehicle is turned off. However, determining the operational state in modern vehicles is not always straightforward.

While many cars have some type of power connector that is switched on with the ignition, and may be desirable to determine vehicle operational state in certain situations, such a power connector can be unique to every vehicle model and in an inconvenient location. This makes a common installation for a power connector in a fleet of passenger vehicles impractical.

Previously, the battery voltage of a vehicle was generally a good indicator that a vehicle was running because the vehicle's battery would be charged by the alternator when the engine was running, which caused the vehicle's electrical system and battery to have a significantly higher voltage (approximately 14-14.4V) than when the car was off (approximately 12.6V). In recent years developments such as "smart alternators" and hybrid powertrains have started to comprise a significant portion of the automotive fleet with such features and such developments render the sole use of battery voltage unreliable to determine the operational state of the vehicle.

In view of the foregoing, it would be desirable to provide a power supply for a vehicle accessory that is capable of determining the operational state of the vehicle. It would be advantageous for such power supply to determine the operational state without predominant reliance on the battery voltage of the vehicle. It would also be advantageous to power the accessory differently dependent on various different operational states.

SUMMARY

A power supply configured for installation in a vehicle is disclosed herein. The vehicle includes a battery, an on-board diagnostics (OBD) port, and a vehicle accessory. In at least one embodiment, the power supply includes a network input configured for connection to a communications network pin of the OBD port, a battery input configured for connection to a battery pin of the OBD port, at least one power output configured for connection to a vehicle accessory, and a controller circuit. The controller circuit is configured to (i) monitor a CAN voltage provided via the network input, (ii) monitor a battery voltage provided via the battery input, and (iii) selectively deliver power to the at least one power output depending at least in part on the communications signal and the battery voltage.

In at least one embodiment, a camera assembly for a vehicle is disclosed. The camera assembly includes a dashboard camera and a power supply configured for connection to the dashboard camera. The power supply includes a controller area network (CAN) input configured for connection to a CAN pin of the OBD port, a battery input configured for connection to a battery pin of the OBD port, at least one power output configured for connection to a vehicle accessory, and a controller circuit. The controller circuit is configured to (i) monitor a CAN voltage provided via the CAN input, (ii) monitor a battery voltage provided via the battery input, and (iii) selectively deliver power to the power output depending at least in part on the CAN voltage and the battery voltage.

In at least one embodiment of the disclosure, a method of operating an electronic accessory associated with a vehicle is disclosed. The method includes (i) monitoring a communications signal provided via a communications network of the vehicle, (ii) monitoring a battery voltage of the vehicle; and (iii) delivering a vehicle operation signal to the electronic accessory when the communications signal and the battery voltage indicate that the vehicle is in operation.

As will be recognized from the foregoing, a power supply is disclosed herein that monitors a vehicle's operating condition through the vehicle's OBD interface (e.g., an OBD2 interface complying with the SAE J1962 Standard). The OBD2 interface has been determined to provide a reliable indication of vehicle operation. Using the OBD2 port is desirable for several reasons. For example, the OBD2 port is a standard interface with a standard connector and communication protocols mandated by law on nearly all passenger vehicles since 1996 for emissions compliance. An exemplary OBD2 interface is shown in FIG. 5. In addition to the standard nature of the OBD2 port, the OBD2 connector is located in approximately the same location on all vehicles and is inside the passenger cabin. This location is often convenient for installation and, depending on the application, may eliminate the need to make holes in the vehicle or for routing wires.

Testing was conducted to develop a device that determined the vehicle's operational state by monitoring the vehicle speed and engine RPM through the CAN BUS on the OBD2 interface. While the detection of the vehicle's operational state was very reliable such a method had an undesirable side-effect on many vehicles of causing a significant power draw when the vehicle was not in operation by keeping the CAN BUS awake with frequent polling of vehicle speed and engine RPM data in addition to requiring a not insignificant amount of power itself to continue sending such requests at a frequency necessary to detect when the vehicle started operation within a reasonable period of time.

This caused significant battery drain and often triggered faults on vehicle ECMs related to high electrical power consumption when the vehicle was not in operation.

The power supply disclosed herein determines the state of vehicle operation by monitoring two primary parameters, which can be determined from pins on the OBD2 connector: (1) voltage on a network communications line of the vehicle (e.g., via the CAN H pin of the OBD port), and (2) vehicle battery voltage (e.g., via the battery voltage pin of the OBD port). Vehicles may shut down power to the CAN interface on the OBD2 port generally within about a minute of the vehicle being shut down. Also, the CAN interface to the OBD2 port may in some instances be re-awoken by features such as remote keyless entry or by the opening of a door, which does not by itself indicate that the vehicle is in operation. Because of this, it is not desirable to turn-on an accessory such as a dashboard camera (aka "dashcam") based solely on the presence of voltage on the CAN H line. The power supply disclosed herein combines the detection of voltage on the CAN H line with the monitoring of battery voltage for a more accurate indication of vehicle operation and determination of when to provide power to a vehicle accessory.

The CAN BUS is a network interface consisting of two lines (HIGH and LOW) with the differential voltage between them is used to transmit data. When the CAN BUS interface is off both the CAN High ("CAN H") and CAN Low ("CAN L") lines will read 0V with respect to vehicle GND. When the CAN BUS interface is active but no data is being transmitted the CAN H and CAN L lines will both read (generally) 2.5V with respect to vehicle GND. During data transmission CAN H voltage will generally vary between 2.5V and 3.5V, while CAN L voltage will generally vary between 1.5V and 2.5V. Thus detecting a voltage of 2.5V or greater on the CAN H line indicates that the CAN network is active and that the vehicle is either in operation or likely to be in operation soon. While CAN H is used in many embodiments of the power supply, in alternative embodiments the power supply monitors other communications network lines, such as the CAN L line. Once network communications signals are detected, the power supply begins monitoring battery voltage.

The battery voltage can be measured from another pin on the ODB2 connector. A vehicle is very likely to be operating if CAN activity is detected and the battery voltage is either above 12.6V or has risen by at least 0.3V from its previous level.

In view of the above, a power supply is disclosed that monitors both (1) Voltage on a communications network line (e.g., the CAN H line), and (2) Battery voltage. The power supply is configured to accurately determine vehicle operation state (running or not running). The power supply is configured to provide up to 2.5 A, 5 VDC power to a dashcam or other vehicle accessory from 12VDC vehicle power source based on vehicle operation state. However, other levels of power may also be provided, depending on the vehicle accessory to power, such as 12VDC power. The power supply is further configured to minimize power consumption when vehicle is not in operation to avoid draining battery and causing the ECM to trigger fault codes for excess power consumption. Furthermore, the power supply is configured to avoid interference with vehicle communication systems or cause fault codes to be triggered. The power supply is easy to install in a vehicle and is compatible with all or nearly all passenger vehicles on the road today. The power supply also allows for customization and additional features such as power-off time delay and/or parking mode signal, as disclosed in further detail herein.

The above described features and advantages, as well as others, will become more readily apparent to those of ordinary skill in the art by reference to the following detailed description and accompanying drawings. While it would be desirable to provide a method and system for power supply that provides one or more of the foregoing or other advantageous features as may be apparent to those reviewing this disclosure, the teachings disclosed herein extend to those embodiments which fall within the scope of any eventually appended claims, regardless of whether they include or accomplish one or more of the advantages or features mentioned herein.

DESCRIPTION

Figure 1:
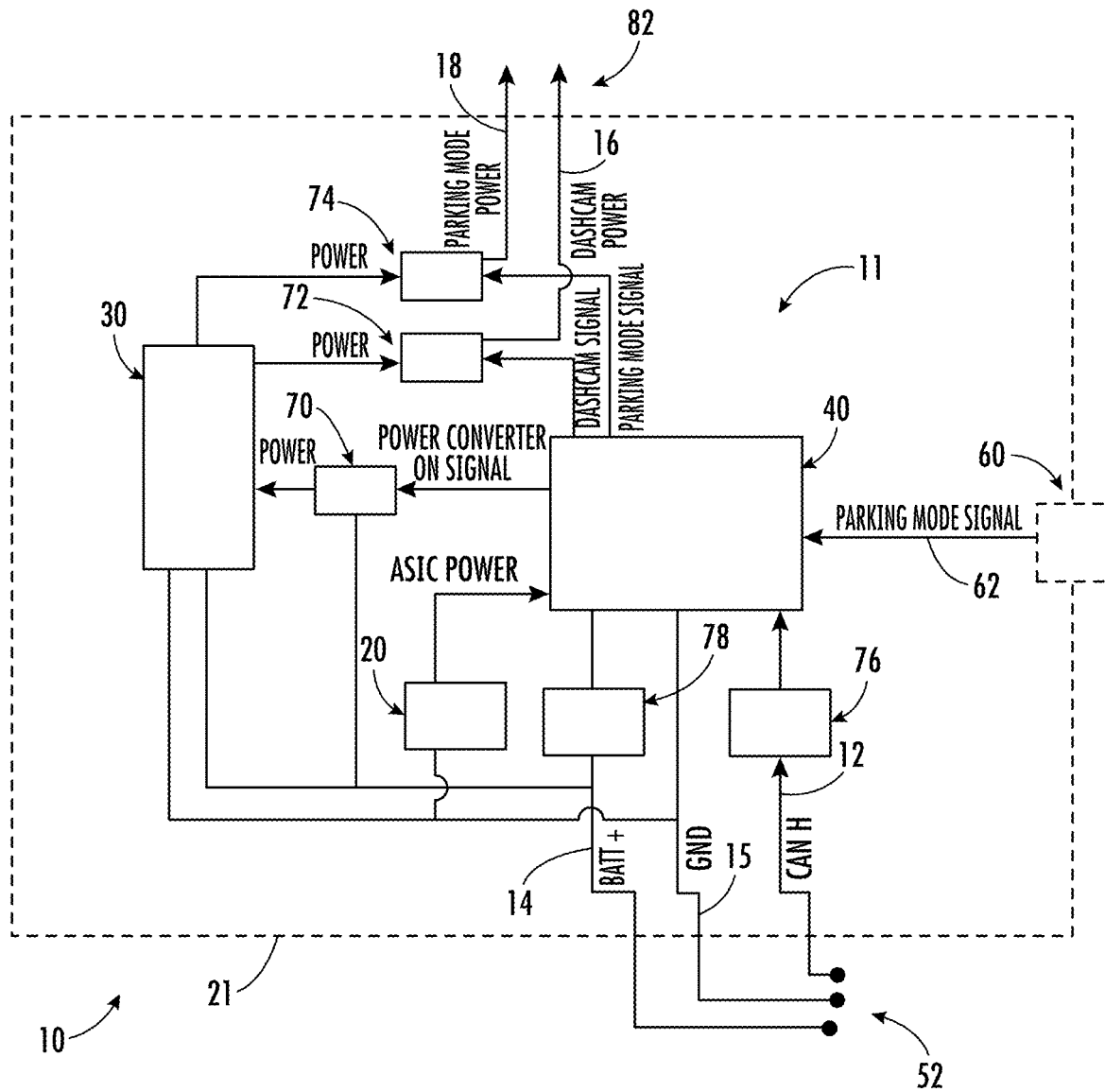
FIG. 1 shows a block diagram of the power supply for use in association with an accessory to a motor vehicle.
Figure 2:
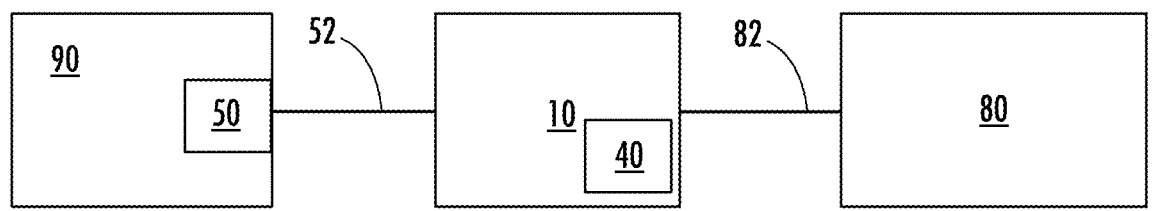
FIG. 2 shows a block diagram of the device of FIG. 1 connected in a vehicle system.
Figure 3:
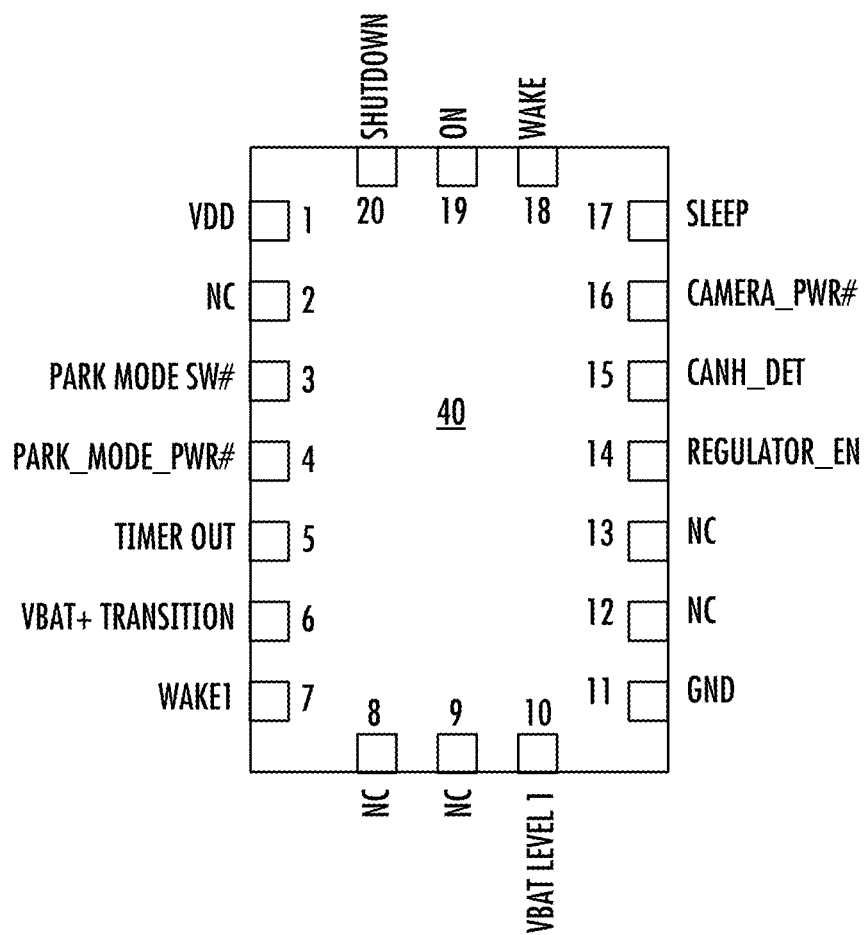
FIG. 3 shows an exemplary pin layout for a controller of a controller circuit for use in the power supply of FIG. 1.

With general reference to FIGS. 1-3, a power supply 10 configured to power an accessory 80 for a vehicle is disclosed herein. The power supply 10 includes a first input 12 and a second input 14. The first input 12 is a communications network input configured for connection to a communications network pin of an OBD port 50 of a vehicle 90. The second input 14 is a battery input configured for connection to a battery voltage pin of the OBD port. The power supply 10 further includes a power output 16 and a mode output 18. The power output 16 is configured to deliver power to the accessory when the vehicle is in operation. The mode output 18 is configured to deliver a mode signal indicative of an accessory operation mode, which signal depends on the state of vehicle operation. The power supply 10 further includes a controller circuit 40 configured to (i) monitor a CAN voltage provided via the CAN input 12, (ii) monitor a battery voltage provided via the battery input 14, and (iii) selectively deliver power and/or control signals to the power output 16 and/or the mode output 18 depending on the CAN voltage and the battery voltage.

Power Supply Circuit

With particular reference now to FIG. 1, a block diagram of one embodiment of the power supply 10 is shown. The power supply 10 includes a control circuit 11 retained within a housing 21. As noted above, the power supply 10 includes a number of inputs and outputs including a network input 12, a vehicle battery input 14, a ground input 15, a power output 16, and a mode output 18. The control circuit 11 of the power supply 10 includes a low quiescent current voltage regulator 20, a high-efficiency DC-DC converter 30, a control ASIC (application-specific integrated circuit) 40, an OBD port connection 52 (including connections to +12 VDC, GND, and CAN H lines), a parking mode switch 60 (and associated input 62), a plurality of semiconductor devices that act as switches 70-78 within the power supply, and an accessory connection 82.

Figure 5:
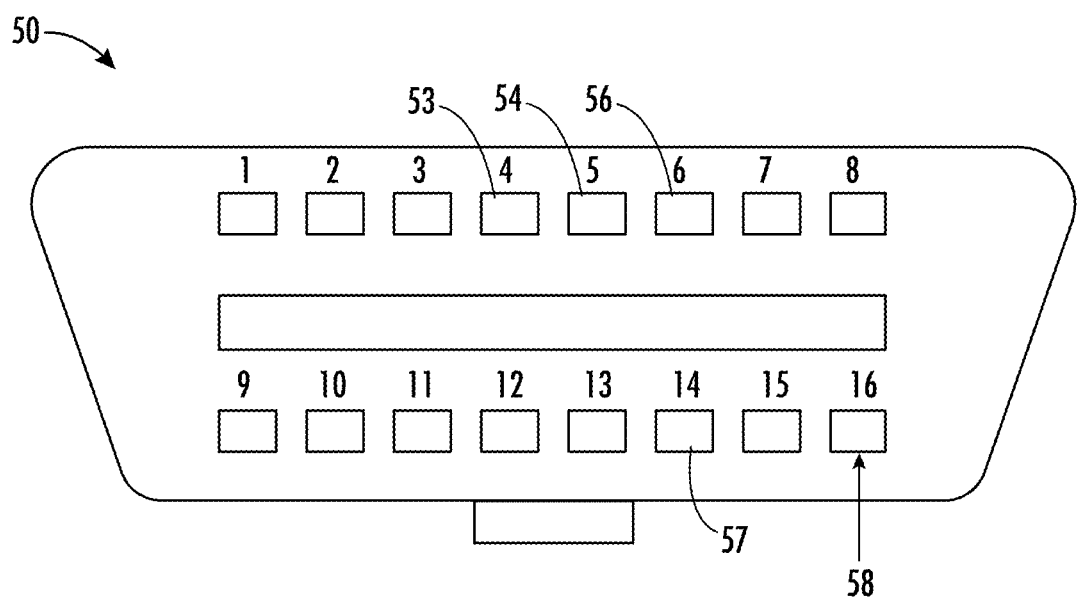
FIG. 5 shows an exemplary OBD2 Port for a motor vehicle.

The network input 12 is configured for connection to a communications network line (i.e., via a communications network pin) of an on-board diagnostics (OBD) port of a vehicle, such as a vehicle OBD 2 port. OBD ports are typically used in association with a vehicle's self-diagnostic and reporting capability, and are a requirement in most modern automobiles, including those sold in the United States. OBD ports include a number of different pins that may be used to monitor various vehicle signals. An exemplary pinout of an OBD port 50 is shown in FIG. 5. The pinouts may be slightly different in different vehicles, but an OBD port 50 typically includes at least a chassis ground pin 53, signal ground pin 54, a number of network communications pins including the CAN-High ("CAN H") pin 56, CAN-Low (CAN L) pin 57 (which CAN H and CAN L pins may be referred to individually herein as simply a "CAN pin"), and a vehicle battery voltage pin 58. It will be recognized that OBD ports may also include a number of additional pins, which are provided at the discretion of the vehicle manufacturer. An OBD port may specifically include one or more additional communications network pins that are tied into a vehicle network and provide communications signals (i.e., data signals related to the vehicle). For example, pin number fifteen of a standard OBD2 port is an optional K-line pin used by some vehicle manufacturers to communicate vehicle data using an asynchronous serial communications protocol.

With particular reference now to FIGS. 1, 2 and 5, the network input 12 (which may be referred to in association with the embodiments disclosed herein as a "CAN line input" or simply a "CAN input") is configured for connection to the CAN H pin 56 of the OBD port 50 via a wire in a cable 52 that extends between the power supply 10 and the OBD port 50 on the vehicle 90, and an associated connector that plugs into the OBD port 50. While the network input 12 the embodiment of FIG. 1 is shown in association with the CAN H pin 56 of the OBD port 50, it will be recognized that in other embodiments the network input 12 may be configured for connection to other communications network lines of the vehicle, such as the CAN L pin 57, or other communications network pins of the OBD port 50.

The vehicle battery voltage input 14 (which may also be referred to herein as simply a "battery input") is configured for connection to the vehicle battery voltage pin 58 of the OBD port 50. This connection is made via a wire in the cable 52 that runs between the power supply 10 and the OBD port 50 on the vehicle. The term "battery" as used herein refers to a battery used to provide power to electrical components and accessories of the vehicle. In at least some embodiments, the battery used to provide power to electrical components and accessories of the vehicle is one of multiple batteries in a vehicle (e.g., some electrical drive vehicles include one battery to power propulsion motors and a separate battery to power electrical components and accessories). It will be recognized that the battery voltage referred to herein may be any voltage that may be used in a vehicle, including, for example, voltages in excess of 12.6V (as are common with typical 12V electrical systems), or electrical systems that are less than 12V.

The power output 16 is configured for connection to the vehicle accessory 80 via a wire in a cable 82 that extends between the power supply 10 and the accessory 80. The power output 16 is configured to provide a 5 VDC (or other voltage) power/signal output for the vehicle accessory (e.g., a dashcam; it will be recognized that a "dashcam" is used interchangeably with an "accessory" in the description section of this document such that a "dashcam" represents any vehicle accessory used in association with the powers supply 10). The power output 16 is particularly configured to supply power for to the dashcam 80 and the associated electronics therein. This power delivered to the dashcam 80 allows for full functionality of the dashcam 80 when the vehicle is in an "on" mode (e.g., when the vehicle engine is running). For example, if the accessory 80 is a dashcam, the power output is configured to supply sufficient power to operate the vehicle camera for an extended period of time during vehicle operation, including functions such as camera recording, audio recording, saving recordings to memory, wireless communication between the dashcam and other devices (e.g., Bluetooth communication with a dashcam app retained on a user's smartphone), etc.

The mode output 18 is configured for connection to the vehicle accessory 80 via a wire in the cable 82 that extends between the power supply 10 and the accessory 80. The mode output 18 is configured to provide a mode signal to the dashcam to indicate an operational mode for the dashcam (e.g., vehicle "on mode", "park mode", etc., as described in further detail herein, or any of various other modes appropriate for the vehicle accessory). The mode output 18 is particularly configured to deliver a mode signal to indicate full functionality of the vehicle accessory when the vehicle is in an operational state (e.g., when the vehicle engine is running), or partial functionality of the vehicle accessory 80 when the vehicle 90 is in a non-operational mode, such as when the vehicle is in a "park" mode (e.g., when the vehicle engine is not running). For example, if the accessory 80 is a dashboard camera, the power output is configured to supply sufficient power to operate the vehicle camera for a limited period of time after the engine enters the park mode (e.g., limited functionality such as reduced sampling period camera recording, audio recording, saving recordings to memory). The mode signal delivered by the mode output 18 may be provided in different forms. In at least one embodiment, the mode signal is a relatively low power signal indicative of a particular vehicle mode. In another embodiment, the mode output 18 may be provided by another 5VDC power/signal output that is used by the dashcam, when available, to indicate that the dashcam should operate using some limited functionality, such as that associated with different modes of the dashcam described in further detail herein.

With specific reference again to FIG. 1, the low quiescent current voltage regulator 20 is a standard regulator that converts 12 VDC to 5 VDC in order to power the control ASIC 40 while minimizing current draw when the control ASIC is in a sleep mode (described in further detail below). This voltage regulator is always active when the power supply is connected to a vehicle.

The high-efficiency DC-DC converter 30 provides 5 VDC power and a high level of current (2.5 A) to the desired accessory device, such as a dashcam or other vehicle accessory 80. The DC-DC converter 30 is an efficient switching converter so heat generation is minimized, but the current draw at rest is too high for this converter to be used to power the control ASIC while in sleep mode.

The control ASIC 40 (which may alternatively be provided by a microprocessor and/or may alternatively be referred to herein as a "controller") runs the desired control algorithm, allows for monitoring of battery voltage and CAN H signal, and allows for control of outputs to turn on the high-efficiency DC-DC converter, and power and signal output to the vehicle accessory. The controller 40 may be provided in a number of different forms capable of running the desired control algorithm for the power supply. For example, it is anticipated that the controller 40 will be provided by a control ASIC, but in at least some embodiments the controller may be implemented by a programmable microchip capable of executing software instructions (provided as a non-transitory computer readable medium), or by analog circuitry, as will be recognized by those of ordinary skill in the art. A pinout diagram for an exemplary controller 40 is shown in FIG. 3. The controller 40 includes the following inputs: VDD, PARK MODE SW #, VBAT+ Transition, VBAT LEVEL 1, GND, and CANH_DET. The controller 40 also includes the following outputs: PARK_MODE_PWR #, TIMER OUT, WAKE1, REGULATOR_EN, CAMERA_PWR #, SLEEP, WAKE, ON, SHUTDOWN.

The park mode switch 60 is a toggle switch that allows the user to control the switch between an "on" position and an "off" position. In the embodiments disclosed herein, the park mode switch 60 is accessible on the exterior of the power supply. The park mode switch 60 may be any type of switch, capable of indicating one of two different states (e.g., an "on" state or an "off" state). In at least some embodiments, the park mode switch 60 is a toggle switch, such as a pushbutton switch or a flip switch, capable of moving between two different positions in order to indicate one of the two different states. A parking mode switch signal input 62 is sent to the control circuit 11 depending on the position of the park mode switch 60. In other embodiments, the park mode switch 60 may be provided in other forms, such as an electronic control via an app on a smartphone that communicates wirelessly with the power supply 10 (or the accessory 80) and allows the user to configure the park mode switch in either the "on" or "off" positions.

The switches 70-78 are generally provided by semiconductor devices such as MOSFETS or other switching devices. In the embodiment of FIG. 1, the switches 70-78 include one or more MOSFETs 70 for turning on a high-efficiency DC-DC converter, one or more MOSFETs 72 for turning on power to the vehicle accessory (i.e., at the first output 16), one or more MOSFETs 74 for turning on a parking mode signal to the vehicle accessory (i.e., at the mode output 18), one or more MOSFETs 76 capable of passing the voltage on a CAN line to the control circuit 11 (i.e., the CAN input 12 connected to either the CAN L or CAN H line of the vehicle OBD2 port), and one or more MOSFETs 78 capable of passing the vehicle battery voltage to the control circuit 11 (i.e., the BATT+ input 14 of the vehicle OBD2 port). While MOSFETs 70-78 are described in association with the embodiment of FIG. 1, it will be recognized that at least some of these MOSFETs may be absent in other embodiments, such as the MOSFET 76 between the CAN H input and the controller 40.

As shown in FIG. 1, the entire control circuit 11 is retained within a housing 21 of the power supply 10. The housing 21 is typically comprised of a rigid plastic structure capable of protecting the control circuit 11 housed within. As noted above, the park mode switch 60 is accessible on the exterior of the housing 21. In at least some embodiments an small display may also be included on an exterior of the housing 21, such as an LED display or other display capable of indicating proper connection of the power supply 10 to the vehicle OBD2 port 50 and/or the associated vehicle accessory. While the power supply 10 is described herein as being separate from the accessory 80, it will be recognized that, in at least some embodiments, the power supply 10 and accessory are commonly housed within a single housing.

General Operation of Power Supply

General operation of the power supply is now described. The power supply 10 is generally configured to operate in one of four different modes/operational states, including a SLEEP mode, WAKE mode, ON mode and SHUTDOWN MODE, examples of which are provided below. Alternative embodiments of operation of the power supply 10 and associated state diagrams explaining transitions between the different are also described in further detail below in the section entitled "State Diagram for Power Supply."

With continued reference to FIG. 1, power to the controller 40 is provided by the voltage regulator 20, which receives power from the battery input 14. With power delivered to the controller 40, the controller 40 awakens when CAN activity is detected via the CAN line input 12. MOSFET 76 may be used to allow a signal to be sent to a pin on the processor from the incoming voltage on the CAN H line. As explained in further detail below, the controller 40 is typically kept in a sleep state (i.e., SLEEP mode) when the vehicle is not in operation to minimize power consumption. When the controller 40 is awakened it begins monitoring the battery voltage frequently for changes to detect if the vehicle has begun operation (WAKE mode).

After CAN activity is detected, and when the controller 40 detects that battery voltage is above 12.9V or has risen by at least 0.3V from a previous detected voltage, the controller 40 determines that the vehicle is in operation and turns on the high-efficiency DC-DC converter 30. This action then turns on power to the vehicle accessory via the power output 16 (ON mode).

When CAN activity is no longer detected on the CAN line 12, the controller 40 keeps the high-efficiency DC-DC converter 30 and the vehicle accessory 80 on for a set period of time (i.e., a shutdown period), and then turns both off. Thereafter, the controller 40 measures battery voltage and enters SLEEP mode (via SHUTDOWN mode).

While in SLEEP mode the controller 40 continues to monitor battery voltage and CAN H voltage. Depending on these voltages (e.g., when the minimum battery voltage changes above a threshold or increases a threshold amount), the controller may again enter the WAKE mode.

In at least some embodiments, the power supply 10 further includes an optional feature called PARKING mode (which may also be referred to herein as a "park mode"). The PARKING mode allows for somewhat different functionality of the dashcam than when in the ON mode. Accordingly, in at least one embodiment of the PARKING mode, the high-efficiency DC-DC converter remains on while the vehicle is not in operation and in the PARKING mode, but the PARKING mode results in a signal to the dashcam to operate in a reduced power/reduced functionality state that will only record if an event is detected instead of continuously recording (this PARKING mode corresponds to the WAKE1 state shown in FIGS. 4A-C, discussed in further detail below). For example, in one embodiment, the PARKING mode causes the dashcam to operate under "time-lapse" functionality wherein the dashcam records continuously in a low frame state (e.g., condensing one hour of normal video footage into one minute). As another example, in one embodiment, the PARKING mode causes the dashcam to operate with "motion activation" functionality such that the camera only records when motion parameters are sensed (e.g., similar to operation of a doorbell camera).

In at least some embodiments, the PARKING MODE setting is controlled by the switch 60 on the side of the power supply 10. In other embodiments, the switch 60 may be provided on the side of the accessory 80. This switch 60 effectively allows the user to select whether or not they would like to utilize the parking mode functionality on their accessory. In any event, PARKING MODE is automatically disabled if the battery voltage falls below 11.7V to avoid draining the battery to the point where the vehicle is unable to be started. Exemplary PARKING MODE functionality is also discussed in further detail below.

Power Supply Connection to Vehicle and Accessory

As noted above, the power supply 10 provides a means for supplying vehicle power to a vehicle accessory. With reference now to FIG. 2, in at least one embodiment, the power supply 10 is an individual unit that is separately housed from the dashcam 80 (or other vehicle accessory). The power supply 10 is configured for connection to the vehicle 90 via a first cable 52 (or wiring harness) that connects the power supply 10 to the OBD2 port 50 (e.g., J1962 port) of the vehicle 90. The connection provided by the first cable 52 may be made via a plug/connector on an end of the first cable 52 that is inserted into the OBD2 port. Alternatively, this connection may be made by a direct connection to the wires leading to the OBD2 port (e.g., by tapping the wires leading to the OBD2 port). As noted in FIG. 1, the cable connecting the power supply to the vehicle 90 includes a power wire 14 (BATT+), ground wire 15 (GND), and one or more CAN signal wires 12 (e.g., CAN H and/or CAN L).

With continued reference to FIG. 2, it will be noted that in addition to the power supply being connected to the vehicle 90, it is also connected to the dashcam 80 (or other vehicle accessory) via a second cable 82 (or wiring harness). This second cable 82 serves as a power wire to the dashcam. Accordingly, the cable 82 contains at least one power wire 16, a mode signal wire 18, and at least one ground wire. As explained in further detail below, the power interface unit is configured to selectively supply power to the dashcam 80 and operate the dashcam 80 in one of several different modes.

As noted previously, it will be recognized that the power supply 10 in FIG. 2 is shown as part of an accessory assembly wherein the power supply 10 is completely separate from the dashcam 80. However, in other embodiments, the power supply 10 may be integrated into the dashcam 80 or other vehicle accessory and commonly housed with such accessory. This embodiment where both the power supply 10 and the accessory are commonly housed provides for efficiencies and cost benefits for overall manufacturing and installation of the device in a vehicle.

State Diagrams for Power Supply

Figure 4A:
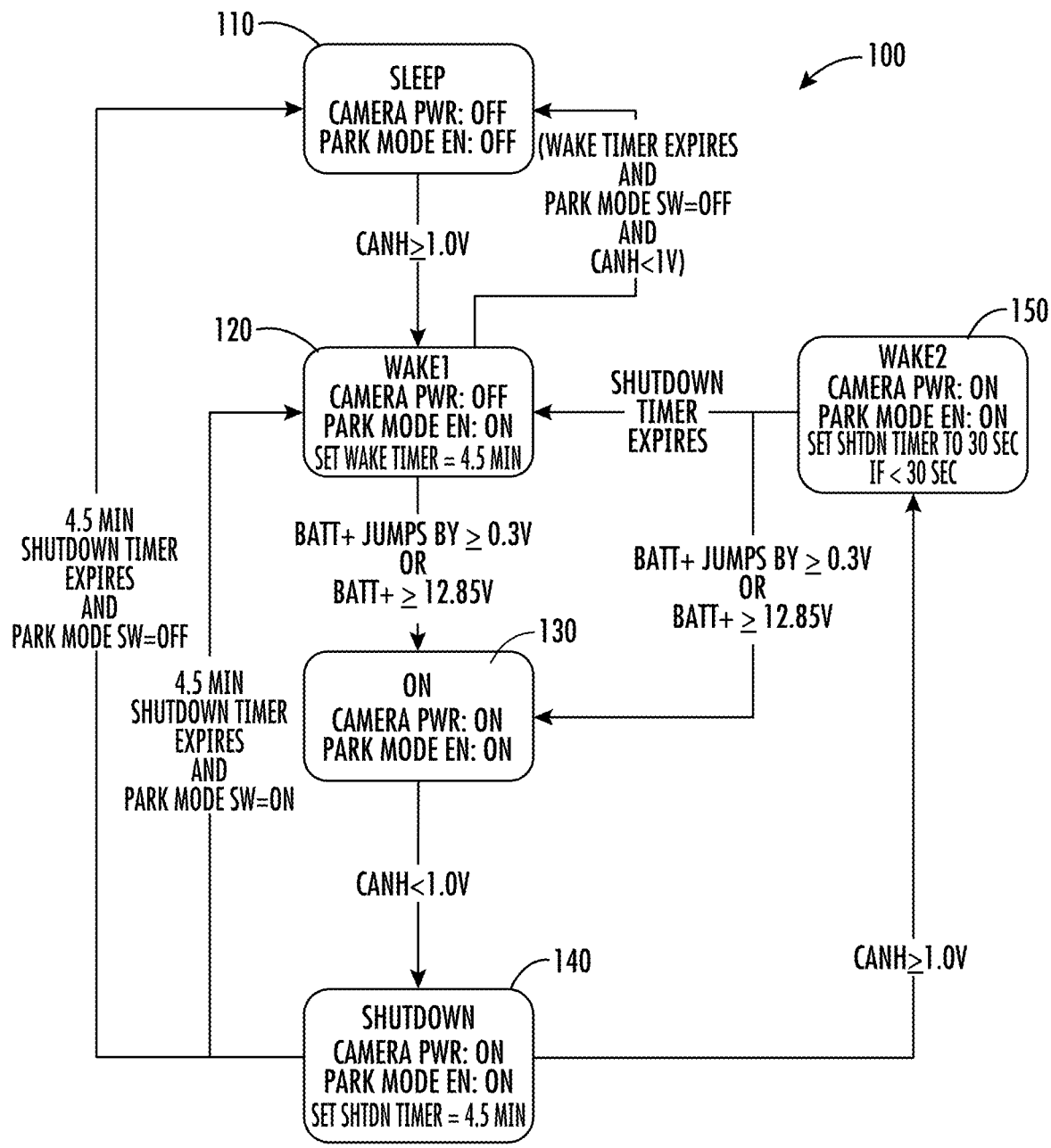
FIG. 4A shows a state diagram for a first embodiment of the power supply of FIG. 1.
Figure 4A:
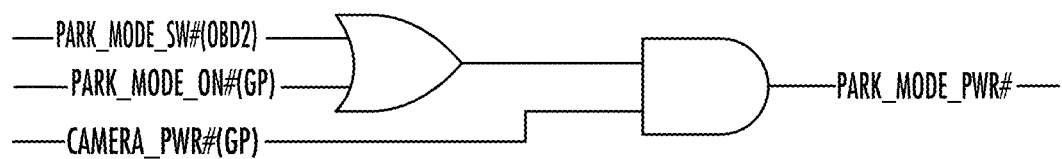

With reference now to FIG. 4A, a state diagram 100 for a first embodiment the power supply 10 is shown, with the power supply being connected to a dashcam 80 or other vehicle accessory, as explained above. As shown at the top of FIG. 4A, the power supply 10 is normally in either a SLEEP state 110 or a WAKE1 state 120 when the vehicle is not in use (e.g., the engine is not running). The SLEEP state 100 is the normal vehicle "off" state. Power to the accessory 80 is off (i.e., not provided) when the power supply is in the SLEEP state. An internal "park mode" is also off when the power supply is in the SLEEP state (i.e., "PARK MODE EN: OFF" as noted in block 110). When in the SLEEP state 110, the power supply 10 continually monitors the voltage on the CAN H line.

It will be recognized in FIG. 4A that the "PARK MODE SW" designation refers to the physical "park mode" switch 60 controlled by a user at either the power supply 10 or the dashcam (or via some other means, such as wirelessly via a smartphone app that controls the power supply or the dashcam). On the other hand, the "PARK MODE EN" designation refers to the internal "park mode" state of the power supply 10 (as determined by the controller 40). Transition between different states may depend in part on the position of the park mode switch 60. For example, as shown in FIG. 4A, transition from the SHUTDOWN state 140 to the SLEEP state 110 occurs when a timer expires and the "park" mode switch 60 is set to the off position (i.e., "PARK MODE SW-OFF"), while transition from the SHUTDOWN state 140 to the WAKE1 state 120 occurs when a timer expires and the "park mode" switch 60 is set to the on position (i.e., "PARK MODE SW=ON")

When the power supply 10 is in the SLEEP state, but then detects a significant signal on the CAN H line (e.g., CAN H≥1.0V), the power supply enters the WAKE1 state 120. Upon entry into the WAKE1 state 120, the power supply 10 sets a wake timer (e.g., 2.5 minutes, 4.5 minutes, or another determined time) and begins a countdown of the wake timer. The power supply also monitors the BATT+ line to determine if the BATT+ signal is ≥12.85V or quickly jumps by ≥0.3V.

The power supply 10 delivers full power to the accessory via the power output 16 when in the WAKE1 state 120, but changes the internal settings for the "park mode" to on (i.e., "PARK MODE EN: ON"), via a mode signal delivered to the mode output 18. As noted previously, when in the park mode, the camera is not on for recording purposes, but does monitor the vehicle for human motion or other activity. Upon recognition of such activity, the camera is powered "on" and begins recording. If no activity is detected, the camera remains "off" while in this mode.

If the wake timer expires without detection of the BATT+ signal being ≥12.85V or jumping by ≥0.3V, the power supply 10 determines whether or not to return to the SLEEP state 110. The power supply 10 returns to the SLEEP state after expiration of the wake timer only if (i) the parking mode switch 60 of the power supply 10 is set to "off" and (ii) the CAN line input 12 is less than 1V (indicating no vehicle activity). However, as long as the parking mode switch 60 remains set to "on", the power supply remains in the WAKE1 state indefinitely until it detects battery activity indicative of vehicle operation. In particular, if the BATT+ signal becomes ≥12.85V or jumps by ≥0.3V when in the WAKE1 state 120, this is indicative of the vehicle being in operation, and the power supply moves to the ON state 130.

In the ON state 130, full power is supplied to the camera with full functionality. With full power supplied to the camera, the camera immediately begins recording so that all activity seen by the camera is recorded and saved to memory during vehicle operation. While in the ON state 130, the power supply 10 continues to monitor the CAN H line. So long as the CAN H line remains ≥1.0V, this is indicative of the vehicle being in an operational state, and the power supply continues to supply full power to the camera such that it remains on and recording.

When the power supply 10 detects that the CAN H line is <1.0V, the power supply moves to the SHUTDOWN state 140. Upon entry into the SHUTDOWN state 140, the power supply 10 sets a shutdown timer (e.g., to 2.5 minutes, 4.5 minutes, or other time) and begins a countdown of the shutdown timer. In the SHUTDOWN state 140 full power to the camera remains on and the camera continues to record. During this time, the power supply also monitors the CAN H line to determine if it jumps back to a value that is ≥1.0V.

If the shutdown timer expires with the value of the CAN H line remaining at <1.0V, the power supply 10 returns to either the SLEEP state 110 or the WAKE1 state 120. In particular, the power supply returns to the SLEEP state 110 when the shutdown timer expires and the park mode switch controlled by the user at the dashcam is in the off position (i.e., "PARK MODE SW=OFF" as shown in FIG. 4A). The power supply returns to the WAKE1 state 120 when the shutdown timer expires and the park mode switch controlled by the user at the dashcam (or at the power supply 10) is in the on position (i.e., "PARK MODE SW=ON" as shown in FIG. 4A).

If the CAN H line returns to a value that is ≥1.0V while the power supply is in the SHUTDOWN state 140 (i.e., the shutdown timer has not expired), the power supply immediately moves to a WAKE2 state 150. When in the WAKE2 state 150, full power is delivered to the camera and it remains on. At this point, the shutdown timer is reset to thirty seconds, provided the shutdown timer was at less than thirty seconds upon entry into the WAKE2 state 150. If the shutdown timer was greater than thirty seconds upon entry into the WAKE2 state 150, the shutdown timer continues to count down. The power supply 10 then monitors the BATT+ line while in the WAKE2 state 150. If the BATT+ signal becomes ≥12.85V or jumps by ≥0.3V when in the WAKE2 state 150, this is indicative of the vehicle being in operation, and the power supply returns to the ON state 130. However, if the shutdown timer expires without the BATT+ signal becoming ≥12.85V or jumping by ≥0.3V when in the WAKE2 state 150, this is indicative of the vehicle likely being in a non-operational state, and the power supply 10 returns to the WAKE1 state 120. As described previously, and as shown in FIG. 4A, the power supply 10 sets a wake timer in the WAKE state. When this wake timer expires (i.e., without the BATT+ signal becoming ≥12.85V or jumping by ≥0.3V), the power supply returns to the SLEEP state 110, provided the park mode switch is in the off position (i.e., "PARK MODE SW=OFF"), but remains in the WAKE1 state if the park mode switch in the on position (i.e., "PARK MODE SW=ON").

As will be recognized from the states of the power supply 10 illustrated in FIG. 4A, the power supply 10 is configured to control power to a dashcam or other vehicle accessory by continually monitoring both a CAN line 12 and the BATT+ line 14. Depending on the signals received at these inputs, power to the vehicle accessory is selectively turned on or off in order to make use of the vehicle accessory only during vehicle operation and/or during times when a user is most likely to be in close proximity to the vehicle if not in operation. This makes the vehicle accessory effective at performing its intended job (e.g., recording what happens during times when the operator is using or in proximity of the vehicle) without excessively draining the vehicle battery when the user is not in proximity of the vehicle.

Figure 4B:
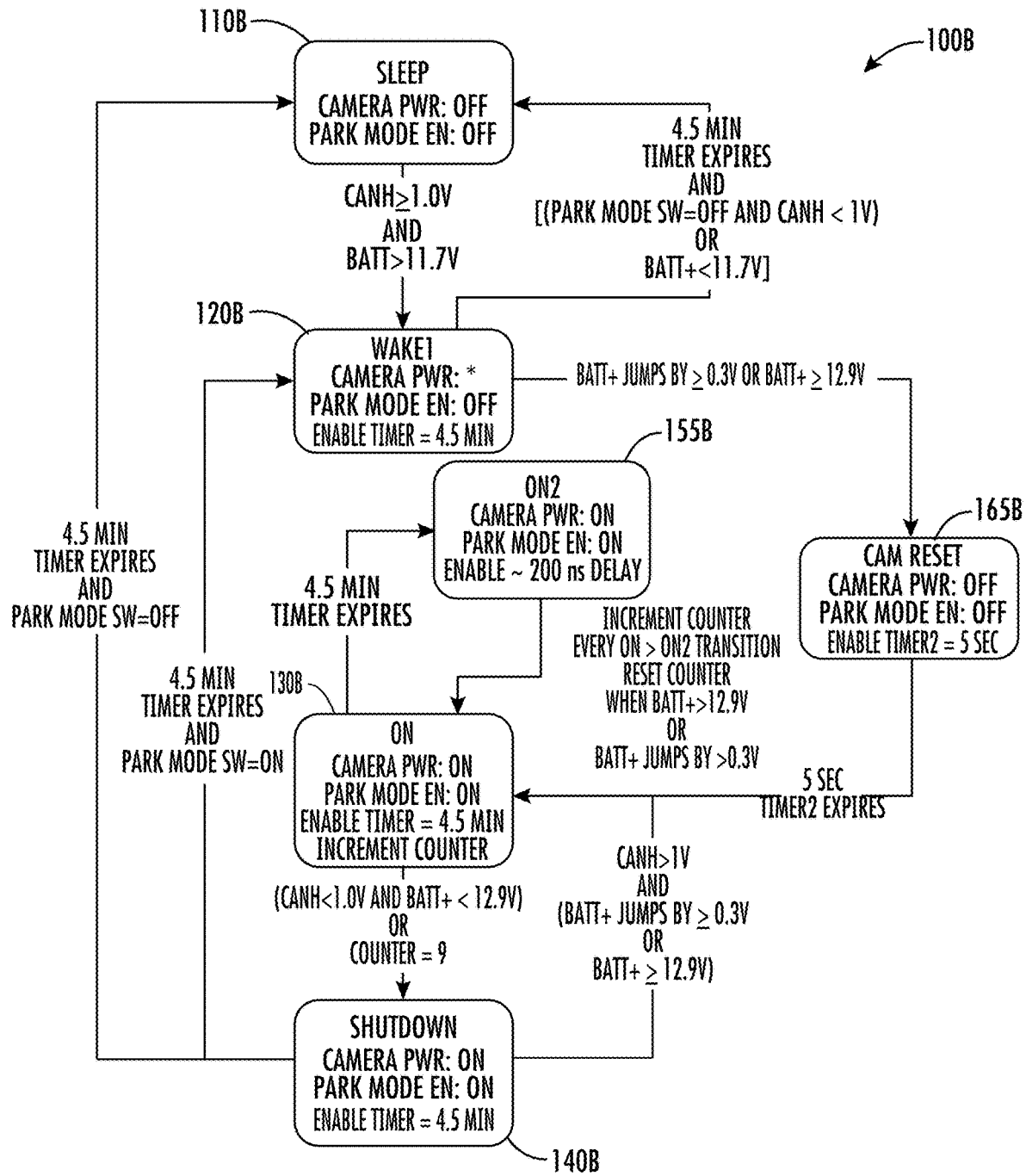
FIG. 4B shows a state diagram for a second embodiment of the power supply of FIG. 1.

With reference now to FIG. 4B, a state diagram 100B is shown for a second embodiment of the power supply 10. This embodiment is similar to that of FIG. 4A, but with a few revisions. For example, the WAKE1 state in the embodiment of FIG. 4B also includes a feature such that the camera power follows the state of the physical park mode switch. In association with this, the embodiment of FIG. 4B includes a vehicle battery saving feature wherein, even if the user-controlled park mode switch is on, the camera may return to the SLEEP state 110B from the WAKE1 state 120B following the expiration of a timer, provided the detected battery voltage is low (e.g., BATT+<11.7V). This feature prevents the camera from recording and/or excessive monitoring of human activity when the vehicle is not in operation, and thereby saves vehicle battery power by automatically moving the power supply 10 from the WAKE1 state to the SLEEP state when the vehicle is off and battery power is low.

In addition to saving vehicle battery power, the state diagram of FIG. 4B also includes a camera reset feature (i.e., "CAM RESET" 165B) when transitioning from the WAKE1 state to the ON state. This feature briefly turns the camera power off (if it was on in the WAKE1 state), and then turns the power back on after a short 5 second timer. The embodiment of FIG. 4B also includes an ON to ON2 transition counter and associated timers which limit the amount of time the camera remains on even if the CAN input 12 remains ≥1.0 V and the BATT+ input 14 remains >12.9 V for an extended period of time (i.e., the increment counter for the 4.5 minute timers is more than nine. When the CAN input 12 and the BATT+ input remain above the thresholds for this extended period of time, the power supply 10 is forced into the SHUTDOWN state 140B. When in the SHUTDOWN state 140B, if the CAN input 12 and the BATT+ input remain above the thresholds, the controller 40 immediately returns to the ON state and the counter for the 4.5 minute timers is reset, thus starting another timer period. However, if the CAN input 12 and the BATT+ input do not remain above the threshold while in the SHUTDOWN state, the power supply 10 returns to either the SLEEP state or the WAKE 1 state, similar to the previously described operation of the SHUTDOWN state described above in association with FIG. 4A.

Figure 4C:
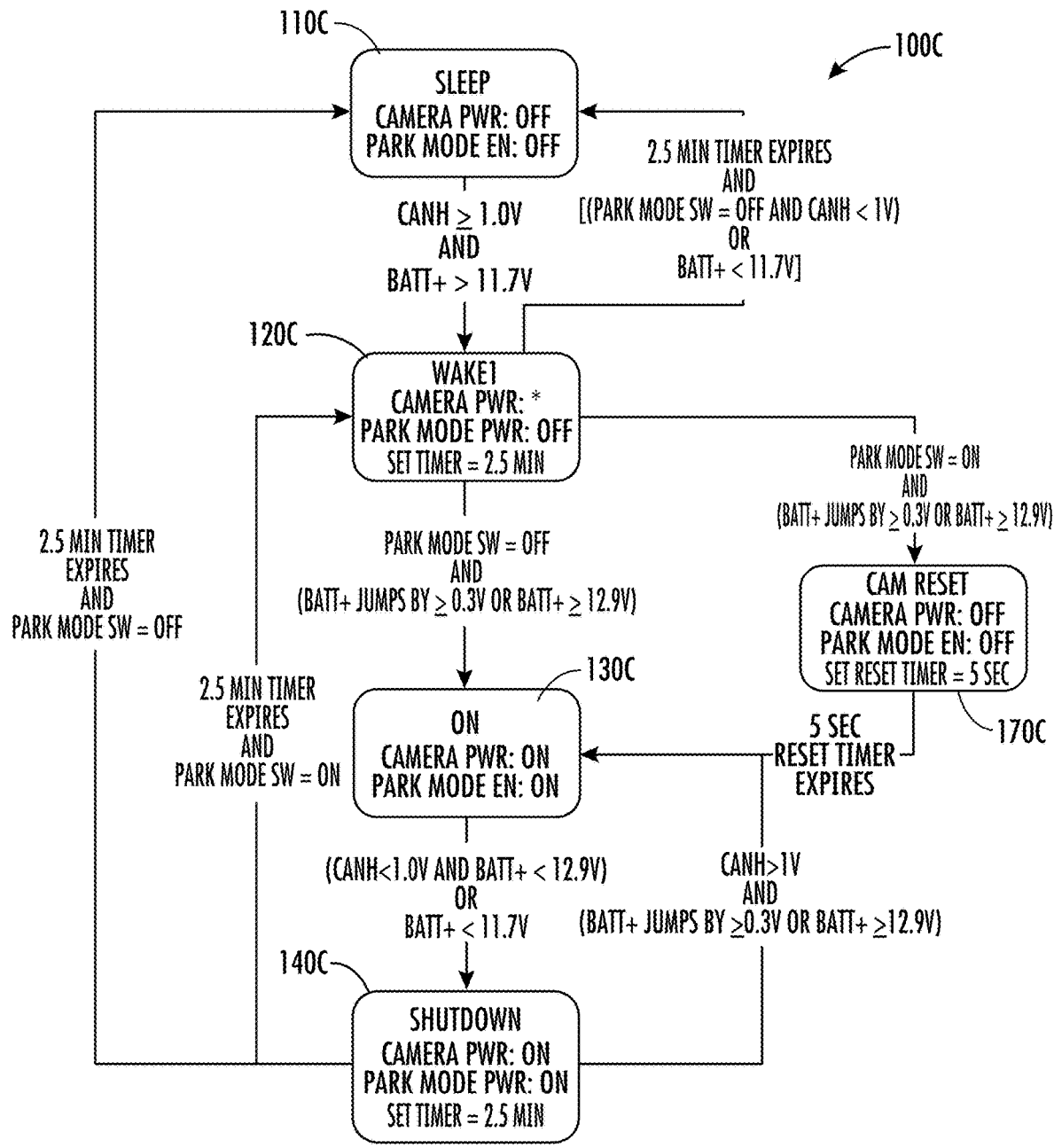
FIG. 4C shows a state diagram for a third embodiment of the power supply of FIG. 1.

With reference now to FIG. 4C, a state diagram is shown for a third embodiment 100C of the power supply 10. This embodiment is again similar to that of FIG. 4A, but with a few revisions. In this embodiment, the transition from the WAKE1 state to another state is dependent on the physical position of the park mode toggle switch 60. Specifically, when in the WAKE1 state 120C, if the BATT+ signal becomes ≥12.9V (or jumps by ≥0.3V), the power supply 10 transitions to either the ON state 130C or the CAM RESET state 170C, depending on the physical position of the park mode toggle switch. If the park mode toggle switch is off (i.e. PARK MODE SW=OFF), the power supply 10 transitions to the ON state 130C. If the park mode toggle switch is on (i.e. PARK MODE SW=ON), the power supply 10 transitions to the CAM RESET state 170C. The CAM RESET state causes the camera power to turn off for a short period (e.g. 5 sec) before transitioning to the ON state 130C. This CAM RESET state is designed to ensure that the camera has not "locked up" or "frozen" from being in an on state for an extended period of time. In other words, the CAM RESET state performs a power cycle of the dashcam in order to improve the chances that it operates as intended such that it turns on and begins recording at the appropriate times. This condition is more likely to occur with software-based power supplies (i.e., the controller 40 is a microprocessor) that are continuously powered for long periods of time, but the condition can typically be easily cleared by power cycling the devices.

Another example of a difference between the embodiment of FIG. 4A and that of FIG. 4C is that the embodiment of FIG. 4C allows for a transition from the WAKE1 state 120C to the SLEEP state 110C even if the park mode switch 60 is set to "on." Specifically, the power module will transition from the WAKE1 state 120C to the SLEEP state 110C when a 2.5 minute wake timer expires and one of (a) the park mode switch is "off" and the CAN line input 12 is <1 V, or (b) the battery input 14 is less than 11.7 V. This feature helps preserve vehicle battery power by preventing the power module from continuously powering the dashcam 80 for extended periods of non-use of the vehicle.

Installation of the Power supply in Vehicle

Figure 6:
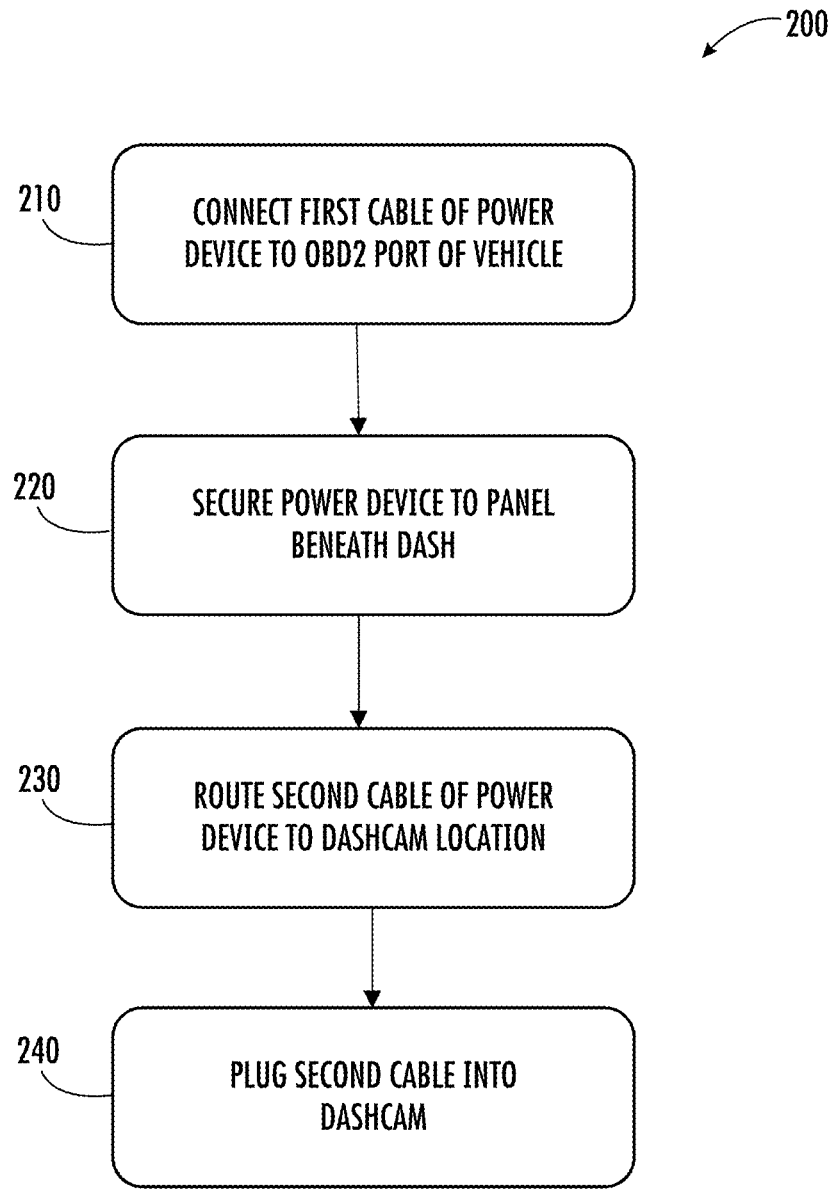
FIG. 6 shows a block diagram of a method of installing the power supply in a vehicle.

A method of installing the power supply 10 in a vehicle is now described in association with FIG. 6. In order to install the power supply 10 in the vehicle, the installer first identifies the OBD2 port on the underside of the dash (typically on the driver side), and plugs the first cable/wiring harness 52 (see FIG. 2) extending from the power supply 10 into the OBD2 port. Alternatively, if there is no connector for plugging into the OBD2 port, the appropriate wires leading to the OBD2 port of the vehicle may be tapped and the associated wires of the power supply connected thereto. This step of connecting the power supply 10 to the OBD2 port is illustrated in block 210 of FIG. 6. As discussed previously, once connected to the OBD2 port, the power supply 10 will be provided with connections to at least the GND, BATT+ and CAN H (or CAN L) leads of the OBD2 port.

The housing of the power supply 10 is then secured to one of the panels under the dash of the vehicle (e.g., using adhesive or fasteners). The panel selected for the power supply 10 should generally be one that conceals the power supply such that it is not easily visible to a vehicle operator, and must be viewed by looking beneath the steering wheel and under the dash. This step is represented in block 220 of FIG. 6.

After connecting the first cable/wiring harness to the OBD2 port, the second cable/wiring harness 82 (see FIG. 2) is guided to the location where the accessory device is installed. This step is represented in block 230 of FIG. 6. This step can be quite involved because the second cable/wiring harness is significantly longer than the first cable/wiring harness yet must be concealed behind various interior vehicle trim pieces in order to provide a clean look for the installation. The reason the second cable is so long is because it must be fed to the location of the dashcam on the vehicle, which is typically at a location near the head of the driver. For example, a dashcam is typically positioned in the rearview mirror area of the front windshield. Additionally, because the second cable must be concealed, a circuitous route is required in order to route the cable to the dashcam, as noted in the paragraphs below. In at least some installations, the length of the second cable should be shortened so that excess cable does not make installation unnecessarily difficult.

As noted above, in order to feed the second cable/wiring harness to the accessory location, the installer at least partially removes various interior vehicle trim pieces (e.g., weather stripping, A-pillar, headliner, etc.). First, the installer removes the weather stripping along the side of the dash and the A-pillar of the vehicle. The second cable is then fed along the dash and through the bottom side of the A-pillar. The weather stripping is then re-inserted along the side of the dash in order to hold the cable in place during the remainder of the installation process.

Next, the installer loosens/partially removes the A-pillar so that the second cable can be fed behind the A-pillar, taking care not to interfere with the side curtain airbag (e.g., by passing the cable behind the airbag). The headliner is also loosened/partially removed so that the second cable can be inserted into the headliner. The installer then pulls down on the headliner and tucks the second cable past the front ribbing of the headliner and into the headliner itself. Any excess wire may be tucked into the headliner at this location. The installer should take care to tuck the second cable far enough behind the ribbing so that it stays in place and does not interfere with re-attachment of the headliner.

The large housing near the rear-view mirror on the front windshield of the vehicle is removed and a notch may optionally be formed in passenger side of the housing, depending on the vehicle in which the dashcam is being installed. The notch should be of sufficient size to pass the cable/wiring harness. The cable/wire harness is positioned such that it comes out of the headliner, into the area of the housing, and then out of the notch. The housing is then reattached to the front windshield with about 1.5 inches of cable extending from the notch.

Once the second cable is routed to the dashcam location at the front windshield, the dashcam is mounted on the front windshield and the second cable is plugged into the dashcam. This step is represented in block 240 of FIG. 6. The dashcam is then ready for operation, including operation in each of the SLEEP, WAKE1, WAKE2, ON and SHUTDOWN states, as described above.

Alternative Embodiments

While one or more exemplary embodiments of the power supply 10 have been discussed herein, it will be recognized that numerous alternative embodiments are possible, including embodiments with fewer features and components, additional features and components, and/or different arrangements or operation of features and components. In at least some alternative embodiments, the power supply is be constructed without the use of a control ASIC and instead relies on a microprocessor for device control and timing, and includes an analog-to-digital converter (ADC) for monitoring battery voltage, battery voltage changes, the presence or absence of voltage on the CAN H line. In other embodiments, the controller may be provided by analog circuitry.

In at least some alternative embodiments, the CAN L line could be used for detection of CAN BUS activity instead of the CAN H line. The terms "CAN line" or "CAN input" as used herein refer to a connection associated with either the CAN L line or the CAN H line of the CAN BUS. Moreover, in at least some embodiments other network communication lines from the OBD port (i.e., communication line pins form the OBD port) may be accessed in order to detect whether the vehicle is in operation. For example, depending on the manufacturer and the particular vehicle, it is possible that any of pins 2, 3, 8-13 or 15 could be monitored to determine vehicle operation (i.e., provided those pins are used as network communications lines, similar to the monitoring of the CAN H line described herein).

In at least one alternative embodiment, the power supply 10 disclosed herein is not used to supply power to a vehicle accessory but is instead used to simply provide an output to the vehicle accessory indicating that the vehicle is operational (i.e., a vehicle operation signal). Accordingly, the power supply 10 disclosed herein may be more generally referred to as a "vehicle operation sensor" with an "accessory output" configured to communicate with the vehicle accessory and indicate vehicle operation. Such a "vehicle operation sensor" monitors a communication network input from the vehicle (e.g., via the OBD port) and a battery voltage input from the vehicle (e.g., also via the OBD port), determines vehicle operation based on the communications network input and the voltage input, and provides some output to the vehicle accessory indicating operation of the vehicle (e.g., one or more of a power output over a wired connection, a signal indicating vehicle operation via a wired connection, or a signal indicating vehicle operation over a wireless connection). Thus, it will be recognized that the "vehicle operation signal" may be provided in any number of forms such as a power output, a vehicle on/off logic signal, or a vehicle state signal (e.g., one of the state's discussed above in association with FIGS. $A-4C).

If a high-current output at the input voltage is desired, the power supply may be provided in an embodiment without the high-efficiency DC-DC converter. Conversely, if power consumption at rest is not of concern, the power supply may be provided in an embodiment without the low quiescent current voltage regulator and instead use the high-efficiency DC-DC converter to power the controller.

In at least one alternative embodiment, a physical park mode switch 60 is not utilized and the state of the park mode switch 60 is controlled by another input, such as a smartphone associated with the power supply 10 or dashcam 80, wherein the smartphone includes an app designed to configure and/or control the power supply 10 or the dashcam 80. In related embodiments, the park mode switch 60 could be used for other purposes than those disclosed herein, such as indicating that whether the dashcam should be allowed to enter the park mode (e.g., switch 60 in the "on" position), or whether the dashcam should be blocked from entering the park mode (e.g., switch 60 in the "off" position).

While the power supply has been described herein as a completely separate device from the dashcam or other vehicle accessory (i.e., the power supply and the accessory are separately housed units connected by a cable), in at least some embodiments the power supply is commonly housed and/or integrated with the vehicle accessory. Accordingly, in these embodiments, there is no need for a cable connecting the power supply and the vehicle accessory. In such an embodiments a cable is run directly from the OBD2 (and/or CAN line) to the accessory and the power supply performs the same operations as disclosed herein within the accessory itself. In embodiments wherein the accessory is a dashcam, the term "camera assembly" refers to the combination of a camera and power supply, regardless of whether the camera and power supply are commonly housed or separately housed.

Exemplary Applications for the Power Supply

The above-describe power supply 10 can accurately detect when a vehicle is operating and when a vehicle stops operating and can provide power to accessories as desired based on these states. As such, the power supply may have many uses in addition to the primary use of powering a dashcam. Examples of such additional uses include the following:

Providing ignition-switched power to other accessories, such as a GPS, radar detector, phone charger, or beverage heater/cooler when the vehicle is in operation;
Providing power to other accessories, such as a GPS tracker, when the vehicle is NOT in operation;
Use in logging vehicle operational activity or use for activation of other devices that log vehicle activity, such as insurance tracking devices;
Use in altering the operator that the vehicle has begun operation and certain tasks need to be performed (i.e. choosing if the vehicle is being operated for personal or business reasons);
Alerting the owner that the vehicle is in operation (perhaps unauthorized operation if a nearby key or token is not present, for example, or detecting who is operating a vehicle at a given time in a fleet);
Use in altering the operator that the vehicle has ceased operation;
Monitoring cabin temperature for alerts for children or animals left in car; and Transmitting a signal wirelessly to indicate that the vehicle is on or off to control other devices The word "vehicle" as used herein is intended to refer to any device used for transporting people or goods, such as cars, trucks, carts, cycles, boats, etc. Although the various embodiments and applications for the power supply have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A power supply configured for installation in a vehicle including a vehicle battery, an on-board diagnostics (OBD) port, and a vehicle accessory, the power supply comprising:
   a network input configured for connection to a communications network pin of the OBD port,
   a battery input configured for connection to a battery pin of the OBD port;
   a power output configured for connection to the vehicle accessory; and
   a controller circuit configured to (i) monitor a communications signal provided via the network input, (ii) monitor a battery voltage provided via the battery input, and (iii) selectively deliver power to the power output depending at least in part on the communications signal and the battery voltage, wherein the controller circuit is configured to transition from a first state to a second state when the communications signal exceeds a first threshold and the battery voltage exceeds a second threshold.

2. The power supply of claim 1 wherein the power supply further includes a mode output configured for connection to the vehicle accessory.

3. The power supply of claim 2 wherein the controller circuit is further configured to supply a mode signal via the mode output, the mode signal including at least one of a first mode signal associated with full functionality of the accessory during vehicle operation and a second mode signal associated with partial functionality of the accessory during vehicle parking.

4. The power supply of claim 3 further comprising a park mode switch, wherein the controller circuit is further configured to monitor a position of the park mode switch and selectively deliver power to the power output and the mode signal via the mode output based at least in part on the position of the park mode switch.

5. The power supply of claim 3 further comprising a park mode switch configured to be toggled between an on position and an off position, wherein:
   the first state is a sleep state and the second state is a wake state;
   when in the sleep state, power is off at the power output of the power supply and the mode signal is not delivered mode output of the power supply; and
   when in the wake state, power at the power output is dependent on a position of the park mode switch, and power at the mode output is off.

6. The power supply of claim 5 wherein the controller circuit is configured to transition from the wake state to an on state when the battery voltage exceeds a third threshold that is greater than the second threshold.

7. The power supply of claim 6 wherein, when the park mode switch is in the on position, the controller is configured to temporarily transition to an accessory reset state when transitioning from the wake state to the on state, wherein power is off at the power output during the reset state.

8. The power supply of claim 6 wherein the controller circuit is configured to transition from the on state to a shutdown state when the communications signal is less than the first threshold or the battery voltage is less than the second threshold.

9. The power supply of claim 8 wherein,
when the park mode switch is off and a shutdown timer expires, the controller circuit is configured to transition from the shutdown state to the sleep state, and
when the park mode switch is on and the shutdown timer expires, the controller circuit is configured to transition from the shutdown state to the wake state.

10. The power supply of claim 1 wherein the vehicle accessory is a dashboard camera and the network input is a controller area network (CAN) input.

11. A camera assembly for a vehicle, the camera assembly comprising:
a camera; and
a power supply configured for connection to the camera, the power supply comprising:
a controller area network (CAN) input configured for connection to a CAN pin of the OBD port;
a battery input configured for connection to a battery pin of the OBD port;
a power output configured for connection to a vehicle accessory; and
a controller circuit configured to (i) monitor a CAN voltage provided via the CAN input, (ii) monitor a battery voltage provided via the battery input, and (iii) selectively deliver power to the power output depending at least in part on the CAN voltage and the battery voltage, wherein the controller circuit is configured to transition from a first state to a second state when the CAN voltage exceeds a first threshold and the battery voltage exceeds a second threshold.

12. The camera assembly of claim 11 wherein the power supply further includes a mode output, the power supply further configured to supply a first mode signal associated with full functionality of the camera during vehicle operation, and a second mode signal associated with partial functionality of the camera during vehicle parking.

13. The camera assembly of claim 12 wherein the power supply further includes a park mode switch, wherein the controller circuit is further configured to monitor a position of the park mode switch and selectively deliver power to the power output and a signal via the mode output based at least in part on the position of the park mode switch.

14. The camera assembly of claim 11 wherein the camera and the power supply are both positioned in a common housing.

15. A method of operating an electronic accessory associated with a vehicle, the method comprising:
monitoring a communications signal provided via a communications network of the vehicle;
monitoring a battery voltage of the vehicle; and
delivering a vehicle operation signal to the electronic accessory when the communications signal and the battery voltage indicate that the vehicle is in operation based on the communications signal exceeding a first voltage threshold and the battery voltage exceeding a second voltage threshold.

16. The method of claim 15 wherein delivering the vehicle operational signal to the electronic accessory includes delivering power to the electronic accessory over a power output and delivering a mode signal to a mode output.

17. The method of claim 16 further comprising monitoring a position of a park mode switch configured to be toggled between an on position and an off position, and selectively delivering power to the power output and selectively delivering the mode signal to the mode output based at least in part on the position of the park mode switch.

18. The method of claim 17 wherein the mode signal includes a first mode signal associated with full functionality of the vehicle accessory during vehicle operation and a second mode signal associated with partial functionality of the vehicle accessory during vehicle parking.

19. The method of claim 15 wherein the vehicle accessory is a camera controlled at least in part by the vehicle operation signal, and wherein the communications signal is a CAN voltage, the method further comprising, prior to monitoring the CAN voltage and the battery voltage:
connecting at least one cable from the power supply to an OBD port of the vehicle;
routing a second cable of the power supply behind one or more interior vehicle trim pieces; and
connecting the second cable to the camera.

20. The camera assembly of claim 13 wherein:
the controller circuit is configured to transition from the second state to a third state when the battery voltage (i) increases by a third threshold within a predetermined period of time or (ii) exceeds a fourth threshold.

* * * * *